(12) United States Patent
Morikoshi

(10) Patent No.: US 10,869,435 B2
(45) Date of Patent: Dec. 22, 2020

(54) EMITTER AND DRIP-IRRIGATION TUBE

(71) Applicant: Enplas Corporation, Saitama (JP)

(72) Inventor: Daisuke Morikoshi, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 16 days.

(21) Appl. No.: 16/322,548

(22) PCT Filed: Jul. 24, 2017

(86) PCT No.: PCT/JP2017/026599
§ 371 (c)(1),
(2) Date: Feb. 1, 2019

(87) PCT Pub. No.: WO2018/025681
PCT Pub. Date: Feb. 8, 2018

(65) Prior Publication Data
US 2019/0174686 A1 Jun. 13, 2019

(30) Foreign Application Priority Data

Aug. 1, 2016 (JP) .................................. 2016-151364

(51) Int. Cl.
*A01G 25/02* (2006.01)
*F04B 43/02* (2006.01)
*A01C 23/02* (2006.01)

(52) U.S. Cl.
CPC ............ *A01G 25/023* (2013.01); *A01C 23/02* (2013.01); *F04B 43/02* (2013.01); *Y02A 40/22* (2018.01)

(58) Field of Classification Search
CPC ....... A01G 25/023; A01C 23/02; F04B 43/02; Y02A 40/237

(Continued)

(56) References Cited

U.S. PATENT DOCUMENTS

2002/0070297 A1* 6/2002 Bolinis ................ A01G 25/023
239/542
2018/0279565 A1 10/2018 Morikoshi

FOREIGN PATENT DOCUMENTS

JP 2017-063746 A 4/2017
WO 2015/044801 4/2015

(Continued)

OTHER PUBLICATIONS

Extended European Search Report from EP Appln. No. 17836787.6 dated Feb. 24, 2020, 9 pages.

(Continued)

*Primary Examiner* — Christopher S Kim
(74) *Attorney, Agent, or Firm* — Brundidge & Stanger, P.C.

(57) ABSTRACT

This emitter has an emitter body, a film, and a cover. A sealed space is formed between the cover and a portion of the film. A flow channel in the emitter include: a first through-hole that is opened in a first surface and a second surface of the emitter body; and a second through-hole that is disposed downstream of the first through-hole. The film is disposed so as to block first surface-side openings of the first through-hole and the second through-hole. The film becomes distorted toward the side of the sealed space due to deformation caused in the film when the temperature of the film exceeds a preset value and when the pressure of irrigation liquid circulating within the flow channel exceeds a preset value, thereby creating a gap between the emitter body and the film, through which the first through-hole and the second through-hole are enabled to be connected.

5 Claims, 7 Drawing Sheets

(58) Field of Classification Search
USPC .......................................................... 239/542
See application file for complete search history.

(56) References Cited

FOREIGN PATENT DOCUMENTS

| WO | 2015/050082 A1 | 4/2015 |
| WO | 2018/190084 A1 | 10/2018 |

OTHER PUBLICATIONS

International Search Report from International Application No. PCT/JP2017/026599 dated Oct. 17, 2017.

* cited by examiner

EMITTER AND DRIP-IRRIGATION TUBE

TECHNICAL FIELD

The present invention relates to an emitter, and a drip irrigation tube including the emitter.

BACKGROUND ART

Conventionally, a drip irrigation method is known as a method for culturing plants. In the drip irrigation method, a drip irrigation tube is disposed on the soil where plants are planted, and irrigation liquid such as water and liquid fertilizer is dropped to the soil from the drip irrigation tube. The drip irrigation method is advantageous at least in that the consumption amount of the irrigation liquid can be minimized.

The drip irrigation tube includes a tube having a plurality of through holes for discharging irrigation liquid, and a plurality of emitters (also referred to as "drippers") joined on the inner wall surface of the tube and configured to discharge irrigation liquid from respective through holes (see, for example, PTL 1).

FIG. 1 is a sectional view of emitter 1 disclosed in PTL 1. Emitter 1 disclosed in PTL 1 includes emitter main body 10 and film 13 shaped integrally with emitter main body 10. Emitter main body 10 and film 13 are formed of polypropylene, for example. Emitter main body 10 includes flow rate adjustment valve 11 and flow rate control valve 12.

Flow rate adjustment valve 11 is composed of four flexible opening-closing parts. The four opening-closing parts deform in accordance with the pressure of the irrigation liquid, and then the widths of the slits between opening-closing parts change With this configuration, flow rate adjustment valve 11 can adjust the flow rate of the irrigation liquid in emitter 1 in accordance with the pressure of the irrigation liquid.

Flow rate control valve 12 includes four opening-closing parts, and the opening-closing parts include a portion that can deform in accordance with the pressure of the irrigation liquid. By the deformation of the portion, widths of the gaps between the opening-closing parts change. With this configuration, flow rate control valve 12 can control the flow rate of the irrigation liquid in emitter 1 in accordance with the pressure of the irrigation liquid.

CITATION LIST

Patent Literature

PTL 1
WO2015/050082

SUMMARY OF INVENTION

Technical Problem

In the emitter disclosed in PTL 1, when the portion (in PTL 1, the flow rate adjustment valve and the flow rate control valve) that can be deformed for adjusting the flow rate of the irrigation liquid is deformed under high temperature, a very long time (e.g. one day) might be required for resetting the portion to the pre-deformation state. Consequently, when the emitter disclosed in PTL 1 is used under high temperature, the performance of the emitter is changed in the period until the emitter is reset to the pre-deformation state, and the irrigation liquid cannot be quantitatively discharged for a certain time period.

An object of the present invention is to provide an emitter and a drip irrigation tube that can quantitatively discharge irrigation liquid even when the emitter is deformed due to the use under high temperature.

Solution to Problem

To solve the above-mentioned problems, the emitter according to the present invention is configured to be joined on an inner wall surface of a tube for distributing irrigation liquid at a position corresponding to a discharging port for communicating between inside and outside of the tube, the emitter being configured to quantitatively discharge the irrigation liquid in the tube to the outside of the tube from the discharging port, the emitter including: an emitter main body including a first surface and a second surface disposed opposite each other; a film having flexibility and joined on the first surface of the emitter main body, the film being made of resin; a cover disposed on the emitter main body with the film sandwiched between the cover and the emitter main body; an intake part disposed in the first surface of the emitter main body, and configured to receive the irrigation liquid; a discharging part disposed in the second surface of the emitter main body, and configured to discharge the irrigation liquid; a channel configured to connect the intake part and the discharging part in the emitter main body, and configured to distribute the irrigation liquid; a pressure reducing channel disposed in the channel, and configured to reduce a pressure of the irrigation liquid received by the intake part; and a flow rate reducing part disposed downstream of the pressure reducing channel in the channel, and configured to reduce a flow rate of the irrigation liquid in accordance with deformation of the film deformed by a pressure of the irrigation liquid in the tube. A closed space is formed between a portion of the film and the cover. The channel includes a first through hole and a second through hole, the first through hole being disposed upstream of the pressure reducing channel or in the pressure reducing channel, the first through hole opening at the first surface and the second surface of the emitter main body, the second through hole being disposed downstream of the pressure reducing channel or in the pressure reducing channel at a position downstream of the first through hole and upstream of the flow rate reducing part, the second through hole opening at the first surface and the second surface of the emitter main body. The film is disposed to close openings of the first through hole and the second through hole on the first surface side. The film is distorted in a direction of the closed space by deformation that is caused when a temperature of the film is greater than a predetermined temperature value and a pressure of the irrigation liquid distributed in the channel is greater than a predetermined first pressure value such that the first through hole and the second through hole communicate with each other through a gap formed between the emitter main body and the film.

To solve the above-mentioned problems, a drip irrigation tube according to the present invention includes: a tube including a discharging port for discharging irrigation liquid; and the above-mentioned emitter joined on the inner wall surface of the tube at a position corresponding to the discharging port.

Advantageous Effects of Invention

An emitter and a drip irrigation tube according to the present invention can quantitatively discharge irrigation liquid even when the emitter is deformed due to the use under high temperature.

DESCRIPTION OF EMBODIMENTS

An embodiment of the present invention is described below in detail with reference to the accompanying drawings.

Configurations of Drip Irrigation Tube and Emitter

Figure 1:
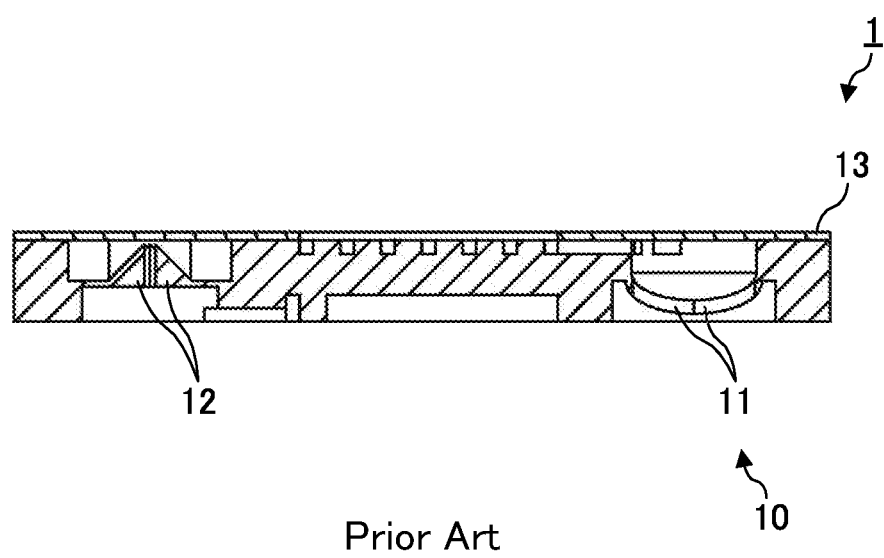
FIG. 1 is a sectional view of an emitter disclosed in PTL 1.
Figure 2:
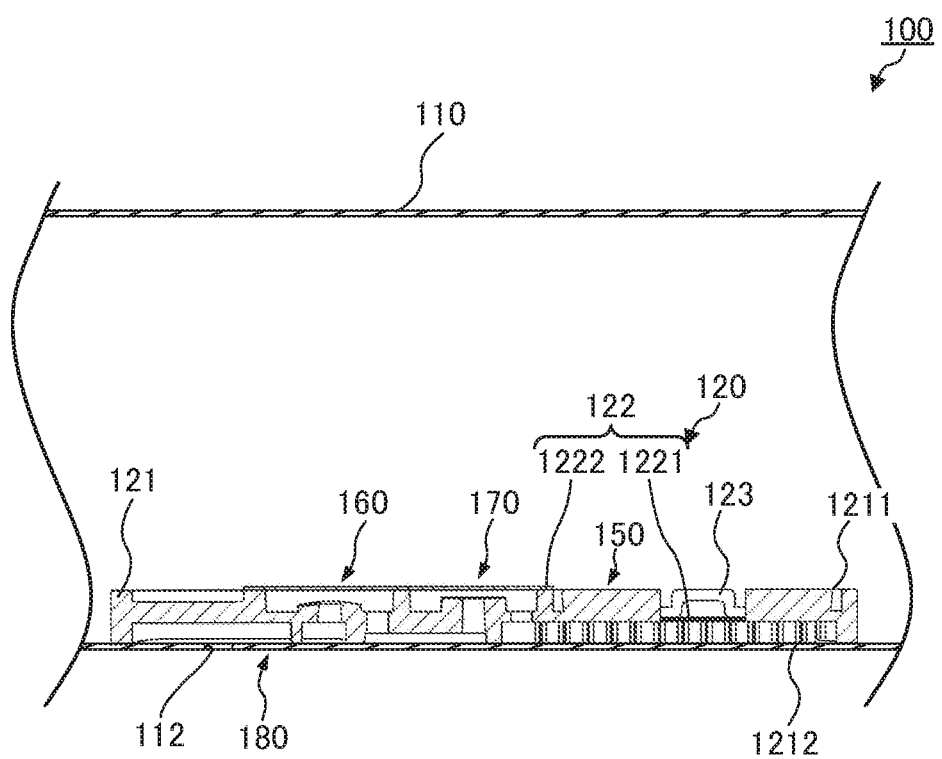
FIG. 2 is a sectional view of a drip irrigation tube according to an embodiment of the present invention.

FIG. 2 is a sectional view along the axial direction of drip irrigation tube 100 according to the present embodiment. As illustrated in FIG. 2, drip irrigation tube 100 includes tube 110 and emitter 120.

Tube 110 is a pipe for carrying irrigation liquid. In the wall of tube 110, a plurality of discharging ports 112 for discharging irrigation liquid are formed at a predetermined interval (e.g. 200 to 500 mm) in the axial direction of tube 110. The diameter of the opening of discharging port 112 is not limited as long as irrigation liquid can be discharged. In the present embodiment, the diameter of the opening of discharging port 112 is 1.5 mm. Emitters 120 are joined at respective positions corresponding to discharging ports 112 on the inner wall surface of tube 110. The cross-sectional shape and the cross-sectional area of tube 110 in the direction perpendicular to the axial direction of tube 110 are not limited as long as emitter 120 can be disposed inside tube 110.

The material of tube 110 is not limited. In the present embodiment, the material of tube 110 is polyethylene.

Examples of the irrigation liquid include water, liquid fertilizer, agricultural chemicals and mixtures thereof.

Figure 3A:
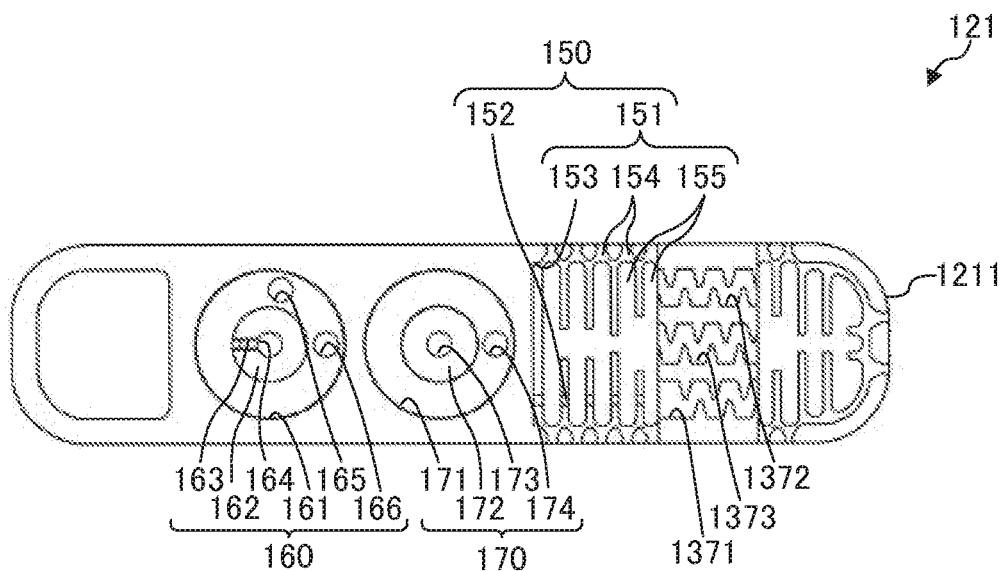
FIGS. 3A to 3C illustrate a configuration of the emitter or an emitter main body according to the embodiment of the present invention.
Figure 3B:
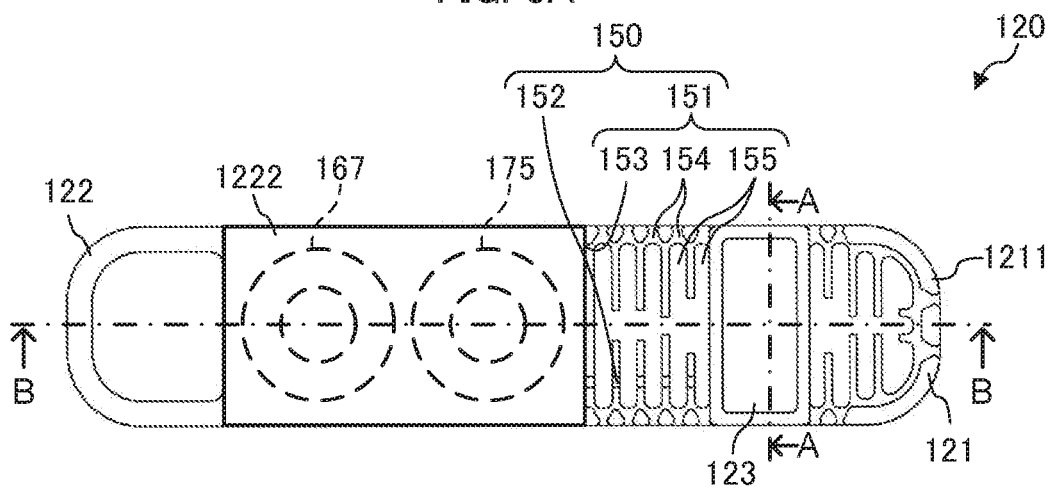
Figure 3C:
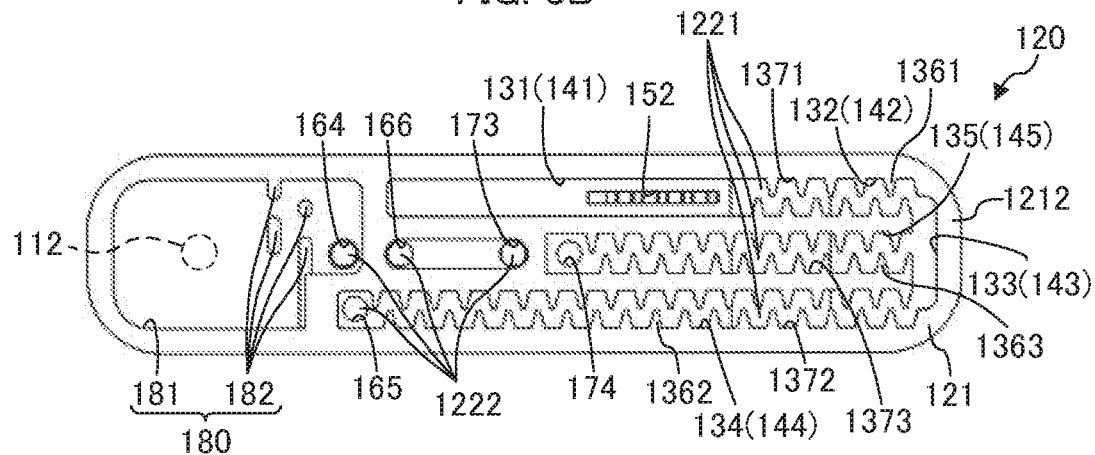
Figure 4A:
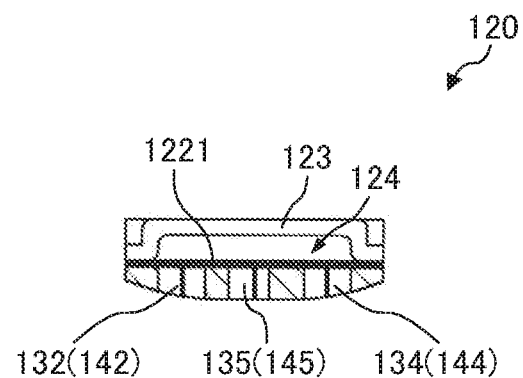
FIGS. 4A and 4B illustrate a configuration of the emitter according to the embodiment of the present invention.
Figure 4B:
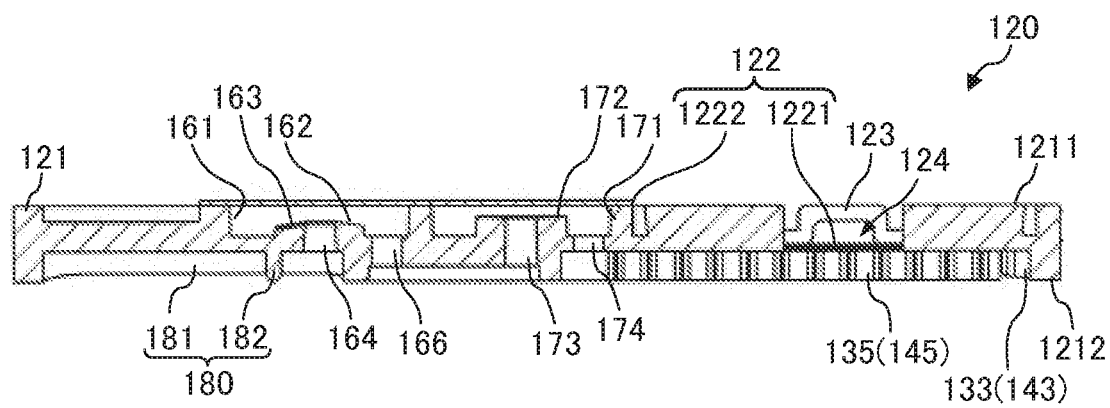

FIGS. 3A to 4B illustrate a configuration of emitter 120 or emitter main body 121 according to the present embodiment. FIG. 3A is a plan view of emitter main body 121, FIG. 3B is a plan view of emitter 120, and FIG. 3C is a bottom view of emitter 120. FIG. 4A is a sectional view taken along line A-A of FIG. 3B, and FIG. 4B is a sectional view taken along line B-B of FIG. 3B.

As illustrated in FIG. 2, emitter 120 is joined on the inner wall surface of tube 110 to cover discharging port 112. The shape of emitter 120 is not limited as long as emitter 120 can make intimate contact with the inner wall surface of tube 110 and can cover discharging port 112. In the present embodiment, in the cross-section of emitter 120 in the direction perpendicular to the axial direction of tube 110, the rear surface, which is joined to the inner wall surface of tube 110, of emitter 120 has a substantially arc shape protruding toward the inner wall surface of tube 110 along the inner wall surface of tube 110 as illustrated in FIG. 4A. In plan view, emitter 120 has a substantially rectangular shape with chamfered four corners. The size of emitter 120 is not limited. In the present embodiment, emitter 120 has a long side length of 25 mm, a short side length of 8 mm, and a height of 2.5 mm.

Emitter 120 includes emitter main body 121 including first surface 1211 and second surface 1212 that are opposite to each other, film 122 joined on first surface 1211 of emitter main body 121, and cover 123 disposed on emitter main body 121 with film 122 therebetween. In the present embodiment, first surface 1211 of emitter main body 121 is located on the front surface side of emitter 120, and second surface 1212 of emitter main body 121 is located on the rear surface side of emitter 120.

Emitter main body 121 and film 122 may be integrally formed, or may be formed as separate members. For example, emitter main body 121 and film 122 may be integrally formed with a hinge part therebetween. For example, film 122 may be joined on first surface 1211 of emitter main body 121 by turning film 122 about the hinge part. The method of joining emitter main body 121 and film 122 is not limited. Examples of the method of joining emitter main body 121 and film 122 include welding of the resin material of film 122, bonding with an adhesive agent, and the like. Note that the hinge part may be cut out after emitter main body 121 and film 122 are joined.

Emitter main body 121 may be formed with a material having flexibility, or a material that does not have flexibility. Examples of the material of emitter main body 121 include resin and rubber. Examples of the resin include polyethylene and silicone. The flexibility of emitter main body 121 may be adjusted by use of an elastic resin material. Examples of the method of adjusting the flexibility of emitter main body 121 include selection of elastic resins, adjustment of the mixing ratio of an elastic resin material to a hard resin material, and the like. Emitter main body 121 may be produced by injection molding, for example.

Film 122 of emitter 120 according to the present embodiment deforms under the pressure of the irrigation liquid. At this time, the higher the temperature of film 122, the more easily film 122 deforms. Film 122 includes first film 1221 and second film 1222. First film 1221 is disposed on emitter main body 121 so as to close the openings of first through hole 1371, second through hole 1372 and third through hole 1373, which are located on first surface 1211 side and described later. In addition, second film 1222 is disposed on emitter main body 121 so as to close the openings of flow rate reducing recess 161 and channel opening-closing recess 171 described later.

The shape and the size of film 122 may be appropriately set in accordance with the sizes of emitter main body 121, the through hole and the recess formed in emitter main body 121 and the like. The size of first film 1221 and the size of second film 1222 may be identical to each other or different from each other. In the present embodiment, first film 1221 and second film 1222 have different shapes and different sizes.

Film 122 is formed with a resin material having flexibility. The material of film 122 may be appropriately set in accordance with a desired flexibility. Examples of the resin include polyethylene. Also, the flexibility of film 122 may be adjusted by use of an elastic resin material. Examples of the method of adjusting the flexibility of film 122 are identical to those of the method of adjusting the flexibility of emitter main body 121. The materials of first film 1221 and second film 1222 may be identical to each other or different from each other. In the present embodiment, the materials of first film 1221 and second film 1222 are identical to each other.

In addition, the thickness of film 122 may be appropriately set in accordance with a desired flexibility. The thickness of first film 1221 and the thickness of second film 1222 may be identical to each other or different from each other. In the present embodiment, first film 1221 and second film 1222 have the same thickness. Film 122 may be produced by injection molding, for example. First film 1221 and second film 1222 may be integrally formed, or may be formed as separate members. In the present embodiment, first film 1221 and second film 1222 are formed as separate members.

Preferably, emitter main body 121 and film 122 are formed with one material having flexibility. Also, preferably, the diaphragm part (first diaphragm part 167 and second diaphragm part 175) described later is integrally formed as a portion of emitter 120. In the present embodiment, emitter main body 121 and film 122 (second film 1222) including the diaphragm part are formed with one material having flexibility as separated members. Here, second film 1222 is not joined on emitter main body 121 at the diaphragm part, but is joined on emitter main body 121 at portions outside the diaphragm part.

Cover 123 and a part (first film 1221) of film 122 form closed space 124 therebetween, and cover 123 is disposed on emitter main body 121 with first film 1221 therebetween. Closed space 124 contains air, and no irrigation liquid enters closed space 124.

The shape and the size of cover 123 are not limited as long as closed space 124 is formed between a part (first film 1221) of film 122 and cover 123 when cover 123 is disposed on emitter main body 121 with film 122 therebetween. In the present embodiment, cover 123 has a substantially cuboid box-shape with an opening formed in one surface. In the present embodiment, cover 123 is joined on first film 1221 at the peripheral portion of cover 123, and thus closed space 124 is formed in the recess of cover 123. In addition, in the region corresponding to closed space 124 of first film 1221, first film 1221 is not joined on emitter main body 121 or cover 123. In the present embodiment, first film 1221 and emitter main body 121 are not joined to each other at a portion between first through hole 1371 (described later) and third through hole 1373 (described later) and at a portion between second through hole 1372 (described later) and third through hole 1373 (described later) in first surface 1211 of emitter main body 121. First film 1221 and emitter main body 121 are joined to each other at the outer edge outside first through hole 1371 and the outer edge outside second through hole 1372 in first surface 1211 of emitter main body 121.

As elaborated later, a gap is formed between emitter main body 121 and first film 1221 when first film 1221 is distorted to closed space 124 side. Regarding the size of closed space 124, it suffices to form a gap that can distribute the irrigation liquid at a desired flow rate. Cover 123 may be joined on first film 1221 after first film 1221 is joined on emitter main body 121. Alternatively, cover 123 may be disposed on emitter main body 121 together with first film 1221 by joining first film 1221 on emitter main body 121 after cover 123 is joined on first film 1221.

As long as closed space 124 can be maintained, cover 123 may be formed with a material having flexibility or a material having no flexibility. Examples of the material of cover 123 include resin and rubber. Examples of the resin include polyethylene and silicone. Cover 123 may be produced by injection molding, for example.

Drip irrigation tube 100 is assembled by joining the rear surface of emitter 120 to the inner wall surface of tube 110. The method of joining tube 110 and emitter 120 is not limited. Examples of the method of joining tube 110 and emitter 120 include welding of the resin material of tube 110 or emitter 120, bonding with an adhesive agent and the like. Normally, discharging port 112 is formed after tube 110 and emitter 120 are joined; however, discharging port 112 may be formed before tube 110 and emitter 120 are joined.

Next, the components of emitter 120 are described from the viewpoint of its function. Emitter 120 includes intake part 150, first connecting channel 141, first pressure reducing channel 142, second connecting channel 143, second pressure reducing channel 144, third pressure reducing channel 145, flow rate reducing part 160, channel opening-closing part 170 and discharging part 180. Intake part 150, flow rate reducing part 160 and channel opening-closing part 170 are disposed in the front surface (first surface 1211 of emitter main body 121) of emitter 120. In addition, first connecting channel 141, first pressure reducing channel 142, second connecting channel 143, second pressure reducing channel 144, third pressure reducing channel 145 and discharging part 180 are disposed in the rear surface (second surface 1212 of emitter main body 121) of emitter 120.

At least first connecting groove 131, first pressure reducing groove 132, second connecting groove 133, second pressure reducing groove 134 and third pressure reducing groove 135 are formed in second surface 1212 of emitter main body 121. When emitter 120 and tube 110 are joined to each other, first connecting groove 131, first pressure reducing groove 132, second connecting groove 133, second pressure reducing groove 134 and third pressure reducing groove 135 function as first connecting channel 141, first pressure reducing channel 142, second connecting channel 143, second pressure reducing channel 144 and third pressure reducing channel 145, respectively.

When emitter 120 and tube 110 are joined to each other, a first channel that connects intake part 150 and discharging part 180 in emitter main body 121 is formed. The first channel is composed of intake part 150, first connecting channel 141, first pressure reducing channel 142, second connecting channel 143, second pressure reducing channel 144, flow rate reducing part 160 and discharging part 180. In addition, a second channel that connects intake part 150 and discharging part 180 in emitter main body 121 is formed. The second channel is composed of intake part 150, first connecting channel 141, first pressure reducing channel 142, second connecting channel 143, third pressure reducing channel 145, channel opening-closing part 170, channel reduction section 160 and discharging part 180. Each of the first channel and the second channel distributes irrigation liquid from intake part 150 to discharging part 180. In the present embodiment, the first channel and the second channel overlap in the region between intake part 150 and second connecting channel 143. In addition, the downstream side of channel opening-closing part 170 in the second channel is connected with flow rate reducing part 160, and the first channel and the second channel also overlap in the region between flow rate reducing part 160 and discharging part 180.

Intake part 150 receives irrigation liquid into emitter 120. Intake part 150 is disposed in first surface 1211 of emitter main body 121 (see FIGS. 3A and 3B). In first surface 1211 where intake part 150 is not disposed, flow rate reducing part 160 and channel opening-closing part 170 are disposed. Intake part 150 includes intake side screen part 151 and intake through hole 152.

Intake side screen part 151 prevents entry, into intake recess 153, of floating matters in the irrigation liquid to be taken into emitter 120. Intake side screen part 151 opens to the inside of tube 110, and includes intake recess 153, a plurality of slits 154 and a plurality of projection lines 155.

Intake recess 153 is a recess that is formed in the region where film 122 is not joined in first surface 1211 of emitter main body 121. The depth of intake recess 153 is not limited, and is appropriately set in accordance with the size of emitter 120. Slits 154 are formed in the outer periphery wall of intake recess 153, and projection lines 155 are formed on the bottom surface of intake recess 153. In addition, intake through hole 152 is formed in the bottom surface of intake recess 153.

Slits 154 connect the inner surface of intake recess 153 and the outer surface of emitter main body 121, and prevent entry, into intake recess 153, of the floating matters in the irrigation liquid while allowing the irrigation liquid to enter intake recess 153 from the side surface of emitter main body 121. The shape of slit 154 is not limited as long as the above-described function can be ensured. In the present embodiment, slit 154 is formed in a shape whose width increases from the outer surface of emitter main body 121 toward the inner surface of intake recess 153 (see FIGS. 3A and 3B). Thus, slit 154 has a so-called wedge wire structure, and therefore the pressure drop of the irrigation liquid having entered intake recess 153 is suppressed.

Projection lines 155 are disposed on the bottom surface of intake recess 153. The placement and the number of projection lines 155 are not limited as long as entry of floating matters of irrigation liquid can be prevented while allowing entry of the irrigation liquid from the opening side of intake recess 153. In the present embodiment, projection lines 155 are arranged such that the longitudinal axial direction of projection lines 155 matches the minor axial direction of emitter 120. In addition, each projection line 155 is formed such that the width thereof decreases from first surface 1211 of emitter main body 121 toward the bottom surface of intake recess 153. That is, in the arrangement direction of projection lines 155, the space between projection lines 155 adjacent to each other has a so-called wedge wire structure. In addition, the distance between projection lines 155 adjacent to each other is not limited as long as the above-described function can be ensured. Since the space between projection lines 155 adjacent to each other has a so-called wedge wire structure as described above, the pressure drop of the irrigation liquid having entered intake recess 153 is suppressed.

Intake through hole 152 is formed in the bottom surface of intake recess 153. The shape and the number of intake through hole 152 are not limited as long as the irrigation liquid taken into intake recess 153 can be taken into emitter main body 121. In the present embodiment, intake through hole 152 is one long hole formed along the longitudinal axial direction of emitter 120 in the bottom surface of intake recess 153. This long hole is partially covered with projection lines 155, and therefore, intake through hole 152 appears to be divided into a plurality of through holes when viewed from first surface 1211 side.

The irrigation liquid that has passed through the inside of tube 110 is taken into emitter main body 121 while the floating matters therein are prevented from entering intake recess 153 by intake side screen part 151.

First connecting groove 131 (first connecting channel 141) connects intake through hole 152 (intake part 150) and first pressure reducing groove 132 (first pressure reducing channel 142). First connecting groove 131 is formed in a linear shape along the longitudinal axial direction of emitter 120 at the outer edge of second surface 1212 of emitter main body 121. When tube 110 and emitter 120 are joined, first connecting groove 131 and the inner wall surface of tube 110 form first connecting channel 141. The irrigation liquid taken from intake part 150 flows to first pressure reducing channel 142 through first connecting channel 141.

First pressure reducing groove 132 (first pressure reducing channel 142) is disposed in the first channel and the second channel and connects first connecting groove 131 (first connecting channel 141) and second connecting groove 133 (second connecting channel 143). First pressure reducing groove 132 (first pressure reducing channel 142) reduces the pressure of the irrigation liquid taken from intake part 150, and guides the liquid to second connecting groove 133 (second connecting channel 143). First pressure reducing groove 132 is disposed in a linear shape along the longitudinal axial direction of emitter 120 at the outer edge of second surface 1212 of emitter main body 121. The upstream end of first pressure reducing groove 132 is connected with first connecting groove 131, and the downstream end of first pressure reducing groove 132 is connected with the upstream end of second connecting groove 133.

First pressure reducing groove 132 (first pressure reducing channel 142) includes first through hole 1371 that opens at first surface 1211 and second surface 1212 of emitter main body 121. The shape, the width and the installation of first through hole 1371 are not limited. In the present embodiment, first through hole 1371 has a zigzag shape in plan view. First through hole 1371 is disposed upstream of first pressure reducing channel 142 or in first pressure reducing channel 142. In the present embodiment, first through hole 1371 is disposed in first pressure reducing channel 142. In addition, together with second through hole 1372 and third through hole 1373 described later, first through hole 1371 is arranged along the minor axis direction of emitter main body 121.

The shape of first pressure reducing groove 132 is not limited as long as the above-described function can be ensured. In the present embodiment, in plan view, first pressure reducing groove 132 has a zigzag shape. In first pressure reducing groove 132, first protrusions 1361, each of which has a substantially triangular prism shape and protrudes from the inner surface of first pressure reducing groove 132, are alternately disposed along the flow direction of the irrigation liquid. In plan view, first protrusions 1361 are disposed such that the tip of each first protrusion 1361 does not cross the central axis of first pressure reducing groove 132. When tube 110 and emitter 120 are joined, first pressure reducing groove 132 and the inner wall surface of tube 110 form first pressure reducing channel 142. The irrigation liquid taken from intake part 150 is guided to second connecting groove 133 (second connecting channel 143) while the pressure thereof is reduced by first pressure reducing channel 142.

Second connecting groove 133 (second connecting channel 143) connects first pressure reducing groove 132 (first pressure reducing channel 142), second pressure reducing groove 134 (second pressure reducing channel 144) and third pressure reducing groove 135 (third pressure reducing channel 145). Second connecting groove 133 is formed in a linear shape along the minor axial direction of emitter 120 at the outer edge of second surface 1212 of emitter main body 121. When tube 110 and emitter 120 are joined, second connecting groove 133 and the inner wall surface of tube 110 form second connecting channel 143. The irrigation liquid that has been taken from intake part 150 and guided to first connecting channel 141 while the pressure thereof is reduced by first pressure reducing channel 142 is guided to second pressure reducing channel 144 and third pressure reducing channel 145 through second connecting channel 143.

Second pressure reducing groove 134 (second pressure reducing channel 144) is disposed upstream of flow rate reducing part 160 in the first channel, and connects second connecting groove 133 (second connecting channel 143) and flow rate reducing part 160. Second pressure reducing groove 134 (second pressure reducing channel 144) guides, to flow rate reducing part 160, the irrigation liquid coming from second connecting groove 133 (second connecting channel 143) while reducing the pressure of the liquid. Second pressure reducing groove 134 is disposed along the longitudinal axial direction of emitter 120 at the outer edge of second surface 1212 of emitter main body 121. The upstream end of second pressure reducing groove 134 is connected with the downstream end of second connecting groove 133, and the downstream end of second pressure reducing groove 134 is connected with first connecting through hole 165 communicated with flow rate reducing part 160.

Second pressure reducing groove 134 (second pressure reducing channel 144) includes second through hole 1372 that opens at first surface 1211 and second surface 1212 of emitter main body 121. Second through hole 1372 is disposed downstream of the first channel relative to first through hole 1371. The shape, the width and the installation of second through hole 1372 are not limited. In the present embodiment, second through hole 1372 has a zigzag shape in plan view. Second through hole 1372 is disposed downstream of second pressure reducing channel 144 or in second pressure reducing channel 144 at a position downstream of first through hole 1371 and upstream of flow rate reducing part 160. In the present embodiment, second through hole 1372 is disposed in second pressure reducing channel 144. In addition, together with first through hole 1371 and third through hole 1373 described later, second through hole 1372 is arranged along the minor axis direction of emitter main body 121.

The shape of second pressure reducing groove 134 is not limited as long as the above-described function can be ensured. In the present embodiment, in plan view, second pressure reducing groove 134 has a zigzag shape as with the shape of first pressure reducing groove 132. In second pressure reducing groove 134, second protrusions 1362, each of which protrudes from the inner surface of second pressure reducing groove 134 and has a substantially triangular prism shape, are alternately disposed along the flow direction of the irrigation liquid. In plan view, second protrusions 1362 are disposed such that the tip of each second protrusion 1362 does not cross the central axis of second pressure reducing groove 134. When tube 110 and emitter 120 are joined, second pressure reducing groove 134 and the inner wall surface of tube 110 form second pressure reducing channel 144. In the present embodiment, second pressure reducing groove 134 (second pressure reducing channel 144) is longer than third pressure reducing groove 135 (third pressure reducing channel 145) described later. Accordingly, the pressure of the irrigation liquid flowing through second pressure reducing groove 134 (second pressure reducing channel 144) is reduced more than the irrigation liquid flowing through third pressure reducing groove 135 (third pressure reducing channel 145). A part of the irrigation liquid that has been taken from intake part 150 while the pressure thereof being reduced is guided to flow rate reducing part 160 while the pressure thereof is reduced by second pressure reducing channel 144.

Third pressure reducing groove 135 (third pressure reducing channel 145) is disposed upstream of flow rate reducing part 160 and channel opening-closing part 170 in the second channel, and connects second connecting groove 133 (second connecting channel 143) and channel opening-closing part 170. Third pressure reducing groove 135 (third pressure reducing channel 145) guides, to channel opening-closing part 170, the irrigation liquid coming from second connecting groove 133 (second connecting channel 143) while reducing the pressure of the liquid. Third pressure reducing groove 135 is disposed along the longitudinal axial direction of emitter 120 at a center portion of second surface 1212 of emitter main body 121. The upstream end of third pressure reducing groove 135 is connected with the downstream end of second connecting channel 143, and the downstream end of third pressure reducing groove 135 is connected with third connecting through hole 174 communicated with channel opening-closing part 170.

Third pressure reducing groove 135 (third pressure reducing channel 145) includes third through hole 1373 that opens at first surface 1211 and second surface 1212 of emitter main body 121. Third through hole 1373 is disposed downstream of the second channel relative to first through hole 1371. The shape, the width and the installation of third through hole 1373 are not limited. In the present embodiment, third through hole 1373 has a zigzag shape in plan view. Third through hole 1373 is disposed downstream of third pressure reducing channel 145 or in third pressure reducing channel 145 at a position downstream of first through hole 1371 and upstream of flow rate reducing part 160. In the present embodiment, third through hole 1373 is disposed in third pressure reducing channel 145. In addition, together with first through hole 1371 and second through hole 1372, third through hole 1373 is arranged along the minor axis direction of emitter main body 121.

The shape of third pressure reducing groove 135 is not limited as long as the above-described function can be ensured. In the present embodiment, in plan view, third pressure reducing groove 135 has a zigzag shape as with the shape of first pressure reducing groove 132. In third pressure reducing groove 135, third protrusions 1363, each of which has a substantially triangular prism shape and protrudes from the inner surface of third pressure reducing groove 135, are alternately disposed along the flow direction of the irrigation liquid. In plan view, third protrusions 1363 are disposed such that the tip of each third protrusion 1363 does not cross the central axis of third pressure reducing groove 135. When tube 110 and emitter 120 are joined, third pressure reducing groove 135 and the inner wall surface of tube 110 form third pressure reducing channel 145. Another part of the irrigation liquid that has taken from intake part 150 while the pressure thereof is reduced by first pressure reducing channel 142 is guided to channel opening-closing part 170 while the pressure thereof is reduced by third pressure reducing channel 145. As elaborated later, the second channel operates only when the pressure of the irrigation liquid is low.

In the first channel and the second channel, flow rate reducing part 160 is disposed downstream of first pressure reducing channel 142, second pressure reducing channel 144 and third pressure reducing channel 145 on the front surface side of emitter 120. Flow rate reducing part 160 sends the irrigation liquid to discharging part 180 while reducing the flow rate of the irrigation liquid in accordance with the deformation of film 122 under the pressure of the irrigation liquid in tube 110.

The configuration of flow rate reducing part 160 is not limited as long as the above-described function can be ensured. In the present embodiment, flow rate reducing part 160 includes flow rate reducing recess 161, first valve seat part 162, communication groove 163, flow rate reducing through hole 164 communicated with discharging part 180, first connecting through hole 165 communicated with second pressure reducing groove 134 (second pressure reducing channel 144), second connecting through hole 166 communicated with channel opening-closing through hole 173 of channel opening-closing part 170, and first diaphragm part 167 that is a portion of second film 1222. At the inner surface of flow rate reducing recess 161, flow rate reducing through hole 164 communicated with discharging part 180, first connecting through hole 165 communicated with second pressure reducing groove 134 (second pressure reducing channel 144), and second connecting through hole 166 communicated with channel opening-closing through hole 173 of channel opening-closing part 170 open.

Flow rate reducing recess 161 is disposed in first surface 1211 of emitter main body 121. In plan view, flow rate reducing recess 161 has a substantially circular shape. In the bottom surface of flow rate reducing recess 161, flow rate reducing through hole 164 communicated with discharging part 180, first connecting through hole 165 communicated with second pressure reducing groove 134 (second pressure reducing channel 144), and second connecting through hole 166 communicated with channel opening-closing part 170, and first valve seat part 162 are disposed. The depth of flow rate reducing recess 161 is not limited as long as the depth of flow rate reducing recess 161 is equal to or greater than the depth of communication groove 163.

Flow rate reducing through hole 164 is disposed at a center portion of the bottom surface of flow rate reducing recess 161, and is communicated with discharging part 180. In the bottom surface of flow rate reducing recess 161, first valve seat part 162 is disposed to surround flow rate reducing through hole 164 such that first valve seat part 162 is opposite to first diaphragm part 167 and is separated from first diaphragm part 167. First valve seat part 162 is formed such that first valve seat part 162 can make intimate contact with first diaphragm part 167 when the pressure of the irrigation liquid flowing through tube 110 is a predetermined value (second pressure described later) or greater. When first diaphragm part 167 makes contact with first valve seat part 162, the flow rate of the irrigation liquid flowing from flow rate reducing recess 161 into discharging part 180 is reduced.

The shape of first valve seat part 162 is not limited as long as the above-described function can be ensured. In the present embodiment, first valve seat part 162 is a protrusion having a cylindrical shape. In the present embodiment, the height of the end surface of the protrusion from the bottom surface of flow rate reducing recess 161 decreases from the inner side toward the outer side.

Communication groove 163, which communicates between the inside of flow rate reducing recess 161 and flow rate reducing through hole 164, is formed in a portion of the surface of first valve seat part 162 where first diaphragm part 167 can make intimate contact with first valve seat part 162. First connecting through hole 165 communicated with second pressure reducing groove 134 (second pressure reducing channel 144) and second connecting through hole 166 communicated with channel opening-closing through hole 173 of channel opening-closing part 170 are formed in the region where first valve seat part 162 is not disposed in the bottom surface of flow rate reducing recess 161. Note that first connecting through hole 165 communicated with second pressure reducing groove 134 (second pressure reducing channel 144) may be disposed so as to be surrounded by first valve seat part 162, and flow rate reducing through hole 164 communicated with discharging part 180 may be disposed outside first valve seat part 162.

First diaphragm part 167 is a portion of second film 1222. First diaphragm part 167 is disposed in such a manner as to prevent the communication between the inside of flow rate reducing recess 161 and the inside of tube 110 and to close the opening of flow rate reducing recess 161. First diaphragm part 167 has flexibility, and deforms in such a manner as to make contact with first valve seat part 162 in accordance with the pressure of the irrigation liquid in tube 110. For example, first diaphragm part 167 is distorted to flow rate reducing recess 161 side when the pressure of the irrigation liquid flowing in tube 110 is greater than a predetermined value. Specifically, first diaphragm part 167 deforms toward first valve seat part 162 as the pressure of the irrigation liquid increases, and finally makes contact with first valve seat part 162. Even when first diaphragm part 167 is in intimate contact with first valve seat part 162, neither of first connecting through hole 165, flow rate reducing through hole 164 nor communication groove 163 is closed by first diaphragm part 167, and therefore the irrigation liquid sent from first connecting through hole 165 can be sent to discharging part 180 through communication groove 163 and flow rate reducing through hole 164. Note that first diaphragm part 167 is disposed next to second diaphragm part 175 described later.

Channel opening-closing part 170 is disposed between third pressure reducing channel 145 (third pressure reducing groove 135) and discharging part 180 in the second channel on the front surface side of emitter 120. Channel opening-closing part 170 opens the second channel in accordance with the pressure in tube 110, and sends the irrigation liquid to discharging part 180. In the present embodiment, channel opening-closing part 170 is connected with flow rate reducing part 160 through channel opening-closing through hole 173 and second connecting through hole 166, and the irrigation liquid from third pressure reducing channel 145 (third pressure reducing groove 135) reaches discharging part 180 through channel opening-closing part 170 and flow rate reducing part 160. The configuration of channel opening-closing part 170 is not limited as long as the above-described function can be ensured. In the present embodiment, channel opening-closing part 170 includes channel opening-closing recess 171, second valve seat part 172, channel opening-closing through hole 173 communicated with second connecting through hole 166 of flow rate reducing part 160, third connecting through hole 174 communicated with third pressure reducing channel 145 (third pressure reducing groove 135), and second diaphragm part 175 that is a portion of second film 1222. At the inner surface of channel opening-closing recess 171, third connecting through hole 174 communicated with third pressure reducing channel 145 (third pressure reducing groove 135), and channel opening-closing through hole 173 communicated with flow rate reducing part 160 open. In addition, channel opening-closing recess 171 is communicated with flow rate reducing recess 161 of flow rate reducing part 160.

In plan view, channel opening-closing recess 171 has a substantially circular shape. In the bottom surface of channel opening-closing recess 171, third connecting through hole 174 connected with third pressure reducing groove 135, channel opening-closing through hole 173 communicated with flow rate reducing part 160, and second valve seat part 172 are disposed. The valve seat surface of second valve seat part 172 is disposed on first surface 1211 side of emitter main body 121 (the front surface side of emitter 120) relative to the valve seat surface of first valve seat part 162. That is, second valve seat part 172 is higher than first valve seat part 162. With this configuration, when film 122 is deformed with the pressure of the irrigation liquid, film 122 first makes contact with second valve seat part 172 before making contact with first valve seat part 162.

Third connecting through hole 174 communicated with third pressure reducing groove 135 is disposed in the region where second valve seat part 172 is not disposed in the bottom surface of channel opening-closing recess 171. Second valve seat part 172 is disposed on the bottom surface of channel opening-closing recess 171 to surround channel opening-closing through hole 173. In addition, second valve seat part 172 is disposed to face second diaphragm part 175 without making contact with second diaphragm part 175, and is formed such that second diaphragm part 175 can make intimate contact with second valve seat part 172 when the pressure of the irrigation liquid flowing through tube 110 is a predetermined value (first pressure described later) or greater. When the pressure of the irrigation liquid flowing through tube 110 is the first pressure or greater, second diaphragm part 175 makes intimate contact with second valve seat part 172 to close channel opening-closing through hole 173, and as a result, the second channel is closed. The shape of second valve seat part 172 is not limited as long as the above-described function can be ensured. In the present embodiment, second valve seat part 172 is a protrusion having a cylindrical shape disposed to surround channel opening-closing through hole 173.

Second diaphragm part 175 is a portion of second film 1222, and is disposed next to first diaphragm part 167. Second diaphragm part 175 is disposed in such a manner as to prevent the communication between the inside of channel opening-closing recess 171 and the inside of tube 110 and to close the opening of channel opening-closing recess 171. Second diaphragm part 175 has flexibility, and deforms in such a manner as to make contact with second valve seat part 172 in accordance with the pressure of the irrigation liquid in tube 110. For example, second diaphragm part 175 is distorted to channel opening-closing recess 171 side when the pressure of the irrigation liquid flowing in tube 110 is greater than a predetermined value. To be more specific, second diaphragm part 175 deforms toward second valve seat part 172 as the pressure of the irrigation liquid increases, and, when the pressure of the irrigation liquid becomes the first pressure, makes contact with second valve seat part 172. In this manner, the second channel (channel opening-closing through hole 173) is closed.

Discharging part 180 discharges the irrigation liquid out of emitter 120. Discharging part 180 is disposed opposite discharging port 112 on second surface 1212 side of emitter main body 121. Discharging part 180 sends, to discharging port 112 of tube 110, the irrigation liquid coming from flow rate reducing through hole 164. With this configuration, discharging part 180 can discharge the irrigation liquid out of emitter 120. The configuration of discharging part 180 is not limited as long as the above-described function can be ensured. In the present embodiment, discharging part 180 includes discharging recess 181 and entry preventing part 182.

Discharging recess 181 is disposed on second surface 1212 side of emitter main body 121. In plan view, discharging recess 181 has a substantially rectangular shape. In the bottom surface of discharging recess 181, flow rate reducing through hole 164 and entry preventing part 182 are disposed.

Entry preventing part 182 prevents entry of foreign matters from discharging port 112. Entry preventing part 182 is not limited as long as the above-described function can be ensured. In the present embodiment, entry preventing part 182 is four protrusions disposed next to each other. The four protrusions are disposed such that the four protrusions are located between flow rate reducing through hole 164 and discharging port 112 when emitter 120 is joined to tube 110.

Operation of Drip Irrigation Tube

Next, an operation of drip irrigation tube 100 is described. Film 122 according to the present embodiment is a resin film, and, when film 122 is used under the pressure of the irrigation liquid in a high-temperature state, long-span elastic deformation of film 122 can result. Here, the term "long-span elastic deformation" means deformation that occurs when the temperature of film 122 is greater than a predetermined value and the pressure of the irrigation liquid in tube 110 is greater than a predetermined value. The time taken for resetting film 122 deformed by the long-span elastic deformation to the original state is, for example, one day. Below, the long-span elastic deformation of film 122, and operations of drip irrigation tube 100 before and after the long-span elastic deformation are described. Here, the "high temperature" is a temperature at which the long-span elastic deformation of film 122 can occur, and is a value that is determined based on the material and/or the thickness of film 122, the pressure of the irrigation liquid in emitter 120 and the like. The "low temperature" is a temperature at which the long-span elastic deformation of film 122 does not occur, and is a value that is determined based on the material and/or the thickness of film 122, the pressure of the irrigation liquid and the like.

Operation of Drip Irrigation Tube Before Long-Span Elastic Deformation of Film

First, irrigation liquid is fed into tube 110. The following describes a case where irrigation liquid is fed into tube 110 under a condition in which no deformation of the long-span elastic deformation of film 122 occurs. Preferably, the pressure of the irrigation liquid that is fed to drip irrigation tube 100 is 0.1 MPa or lower in view of simply implementing the drip irrigation method, or preventing damaging of tube 110 and emitter 120. The irrigation liquid in tube 110 is taken into emitter 120 from intake part 150. To be more specific, the irrigation liquid in tube 110 enters intake recess 153 from the gap between slits 154, or the gap between projection lines 155 and passes through intake through hole 152. At this time, the floating matters in the irrigation liquid can be removed since intake part 150 includes intake side screen part 151 (the gaps between slits 154 and projection lines 155). In addition, the pressure drop of the irrigation liquid having entered intake part 150 is suppressed since a so-called wedge wire structure is formed in intake part 150.

The irrigation liquid taken from intake part 150 reaches first connecting channel 141. The irrigation liquid having reached first connecting channel 141 reaches second connecting channel 143 through first pressure reducing channel 142. The irrigation liquid having reached second connecting channel 143 flows into second pressure reducing channel 144 and third pressure reducing channel 145. At this time, the irrigation liquid first advances through third pressure reducing channel 145 that causes smaller pressure drop and has a shorter channel length in comparison with second pressure reducing channel 144. The irrigation liquid having entered third pressure reducing channel 145 flows into channel opening-closing part 170 through third connecting through hole 174.

The irrigation liquid having entered channel opening-closing part 170 flows into flow rate reducing part 160 through channel opening-closing through hole 173 and second connecting through hole 166. Next, the irrigation liquid having entered flow rate reducing part 160 flows into discharging part 180 through flow rate reducing through hole 164. Finally, the irrigation liquid having entered discharging part 180 is discharged out of tube 110 from discharging port 112 of tube 110.

On the other hand, the irrigation liquid having entered second pressure reducing channel 144 flows into flow rate reducing part 160 through first connecting through hole 165. The irrigation liquid having entered flow rate reducing part 160 flows into discharging part 180 through flow rate reducing through hole 164. The irrigation liquid having entered discharging part 180 is discharged out of tube 110 from discharging port 112 of tube 110.

Now, operations of flow rate reducing part 160 and channel opening-closing part 170 in accordance with the pressure of the irrigation liquid in tube 110 is described.

Figure 5A:
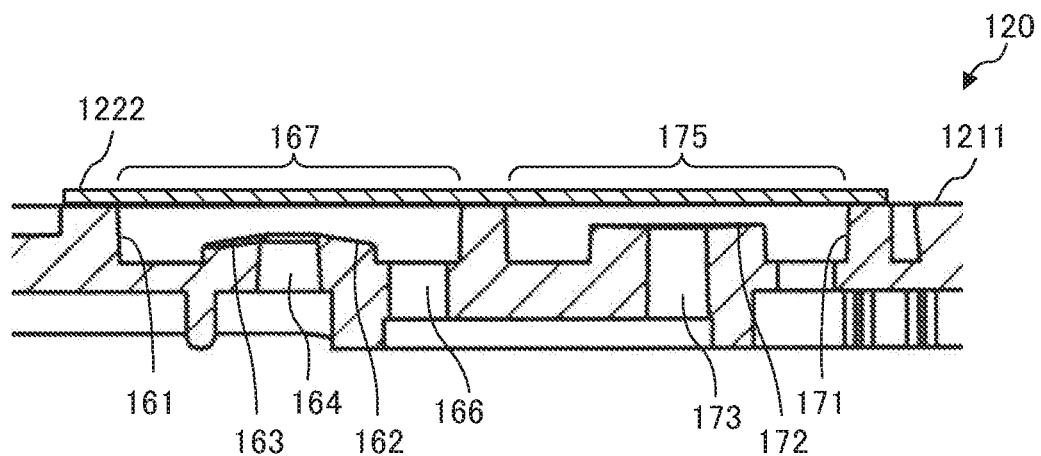
FIGS. 5A to 5C are schematic views illustrating a relationship between operations of a flow rate reducing part and a channel opening-closing part.
Figure 5B:
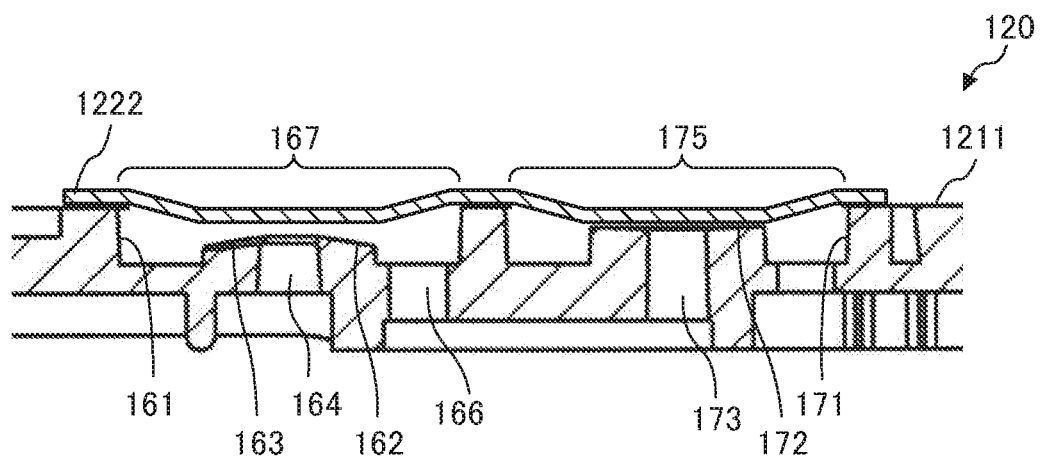
Figure 5C:
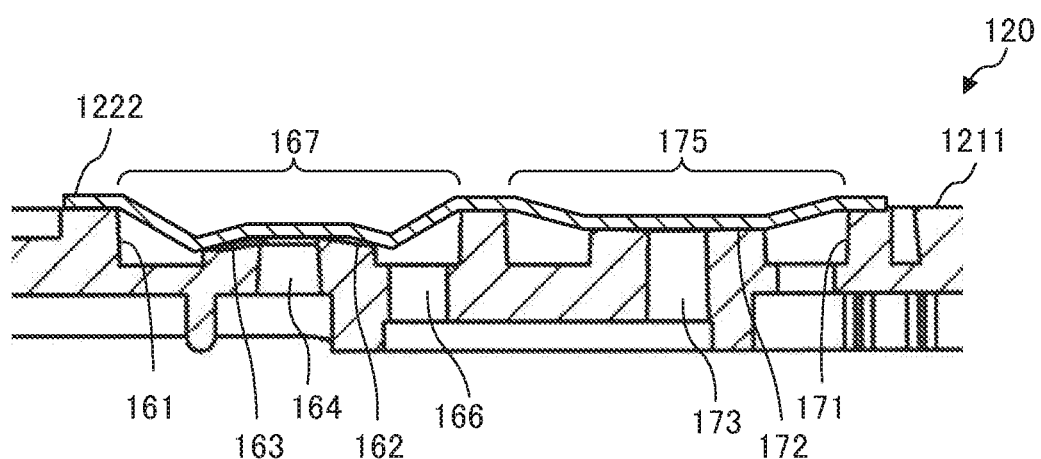

FIGS. 5A to 5C are schematic views illustrating a relationship between operations of flow rate reducing part 160 and channel opening-closing part 170. Note that FIGS. 5A to 5C are schematic cross-sectional views taken along line B-B of FIG. 3B. FIG. 5A is a sectional view of a state where no irrigation liquid is fed to tube 110, FIG. 5B is a sectional view of a state where the pressure of the irrigation liquid in tube 110 is a first pressure, and FIG. 5C is a sectional view of a state where the pressure of the irrigation liquid in tube 110 is a second pressure greater than the first pressure.

Channel opening-closing part 170 and flow rate reducing part 160 are communicated with each other through channel opening-closing through hole 173 and second connecting through hole 166. In addition, in flow rate reducing part 160, first diaphragm part 167 deforms in accordance with the pressure of the irrigation liquid in tube 110, whereby the flow rate of the irrigation liquid is controlled. In channel opening-closing part 170, second diaphragm part 175 deforms in accordance with the pressure of the irrigation liquid in tube 110, whereby the flow rate of the irrigation liquid is controlled.

In a state before the irrigation liquid is fed into tube 110, no pressure of the irrigation liquid is applied to second film 1222, and therefore neither first diaphragm part 167 nor second diaphragm part 175 deforms (see FIG. 5A).

When feeding of irrigation liquid into tube 110 is started, deformation of first diaphragm part 167 and second diaphragm part 175 is started. In this state, second diaphragm part 175 is not in intimate contact with second valve seat part 172, and accordingly the irrigation liquid taken from intake part 150 is discharged out of tube 110 from discharging port 112 through both the first channel (first connecting channel 141, first pressure reducing channel 142, second connecting channel 143, second pressure reducing channel 144, flow rate reducing part 160 and discharging part 180) and the second channel (first connecting channel 141, first pressure reducing channel 142, second connecting channel 143, third pressure reducing channel 145, channel opening-closing part 170, flow rate reducing part 160 and discharging part 180). In this manner, when feeding of the irrigation liquid to tube 110 is started, and/or when the pressure of the irrigation liquid in tube 110 is lower than a predetermined pressure, the irrigation liquid taken from intake part 150 is discharged through both the first channel and the second channel.

When the pressure of the irrigation liquid in tube 110 increases, first diaphragm part 167 and second diaphragm part 175 further deform. Then, second diaphragm part 175 makes contact with second valve seat part 172 and closes the second channel (see FIG. 5B). At this time, since the valve seat surface of second valve seat part 172 is disposed on first surface 1211 side (the front surface side of emitter 120) relative to the valve seat surface of first valve seat part 162, second diaphragm part 175 makes contact with second valve seat part 172 before first diaphragm part 167 makes contact with first valve seat part 162. At this time, first diaphragm part 167 is not in contact with first valve seat part 162. In this manner, when the pressure of the irrigation liquid in tube 110 is so increased as to deform film 122, second diaphragm part 175 comes closer to second valve seat part 172, and accordingly the amount of the irrigation liquid that is discharged through the second channel decreases. Then, when the pressure of the irrigation liquid in tube 110 becomes the first pressure, the irrigation liquid in the second channel is not discharged from discharging port 112. As a result, the irrigation liquid taken from intake part 150 is discharged out of tube 110 from discharging port 112 through only the first channel.

When the pressure of the irrigation liquid in tube 110 further increases, first diaphragm part 167 further deforms toward first valve seat part 162. In a normal configuration, the amount of the irrigation liquid that flows through the first channel increases as the pressure of the irrigation liquid increases; however, in emitter 120 according to the present embodiment, excessive increase in the amount of the liquid that flows through the first channel irrigation is prevented by reducing the distance between first diaphragm part 167 and first valve seat part 162 while the pressure of the irrigation liquid is reduced by first pressure reducing channel 142 and second pressure reducing channel 144. When the pressure of the irrigation liquid in tube 110 is equal to or greater than the second pressure, which is greater than the first pressure, first diaphragm part 167 makes contact with first valve seat part 162 (see FIG. 5C). Even in this state, neither of first connecting through hole 165, flow rate reducing through hole 164 nor communication groove 163 is closed by first diaphragm part 167, and accordingly the irrigation liquid taken from intake part 150 is discharged out of tube 110 from discharging port 112 through communication groove 163. In this manner, in flow rate reducing part 160, when the pressure of the irrigation liquid in tube 110 is equal to or greater than the second pressure, first diaphragm part 167 makes contact with first valve seat part 162, and thus increase of the amount of the irrigation liquid that flows through the first channel is suppressed.

Thus, flow rate reducing part 160 and channel opening-closing part 170 function to compensate the respective flow rates in accordance with deformation of second film 1222 under the pressure of the irrigation liquid in tube 110. As a result, drip irrigation tube 100 according to the present embodiment can discharge a certain amount of irrigation liquid out of tube 110 regardless of whether the pressure of the irrigation liquid is low or high.

Long-Span Elastic Deformation of Film

Emitter 120 of drip irrigation tube 100 according to the present embodiment includes resin film 122 (first film 1221 and second film 1222). With this configuration, deformation of film 122 is kept for a long period (e.g. one day) in the case where high temperature irrigation liquid is introduced into emitter 120, the temperature of film 122 is greater than a predetermined value, and the pressure of the irrigation liquid distributed in the first channel and the second channel is greater than a predetermined value. The above-mentioned predetermined value of the temperature of film 122 may be appropriately set in accordance with the material and/or the thickness of film 122. Also, the above-mentioned predetermined value of the pressure of the irrigation liquid may be appropriately set in accordance with the material and/or the thickness of film 122.

Figure 6A:
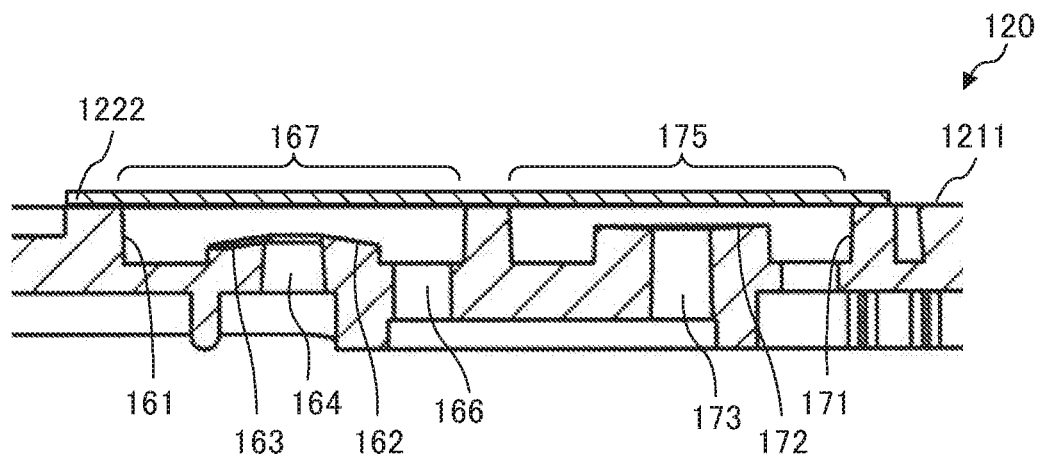
FIGS. 6A and 6B are sectional views of the emitter for describing long-span elastic deformation of a second film.
Figure 6B:
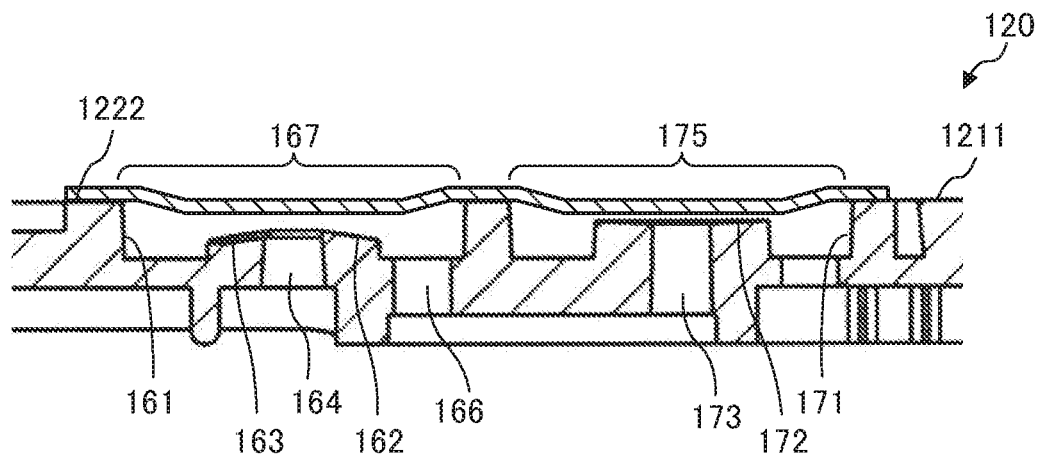

First, the long-span elastic deformation of second film 1222 is described. FIGS. 6A and 6B are sectional views of emitter 120 for describing the long-span elastic deformation of second film 1222. FIGS. 6A and 6B are partially enlarged sectional views taken along line B-B of FIG. 3B. FIG. 6A is a partially enlarged sectional view of emitter 120 before long-span elastic deformation, and FIG. 6B is a partially enlarged sectional view of emitter 120 after long-span elastic deformation.

Before the pressure of the irrigation liquid distributed in the channel exceeds a predetermined value and the temperature of second film 1222 exceeds a predetermined value, second film 1222 is not deformed (see FIG. 6A). As described above, second film 1222 made of resin deforms in accordance with the pressure of the irrigation liquid in tube 110 (see FIGS. 5A to 5C). When second film 1222 made of resin is deformed due to the use under a high temperature, the deformed shape is held over a long period of time. Consequently, second film 1222 distorted by the long-span elastic deformation cannot be reset to the pre-deformed original shape for a certain time period (see FIG. 6B). As a result, the distance between first diaphragm part 167 and first valve seat part 162 is reduced, and the distance between second diaphragm part 175 and second valve seat part 172 is reduced. Consequently, the flow rate of the irrigation liquid that flows into flow rate reducing part 160 from channel opening-closing part 170 and the flow rate of the irrigation liquid that flows into discharging part 180 from flow rate reducing part 160 are reduced, and accordingly the flow rate of the irrigation liquid discharged from drip irrigation tube 100 becomes insufficient.

Figure 7A:
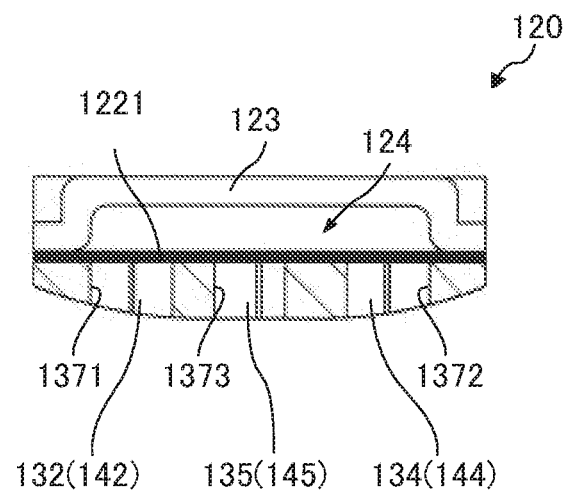
FIGS. 7A and 7B are sectional views of the emitter for describing long-span elastic deformation of a first film.
Figure 7B:
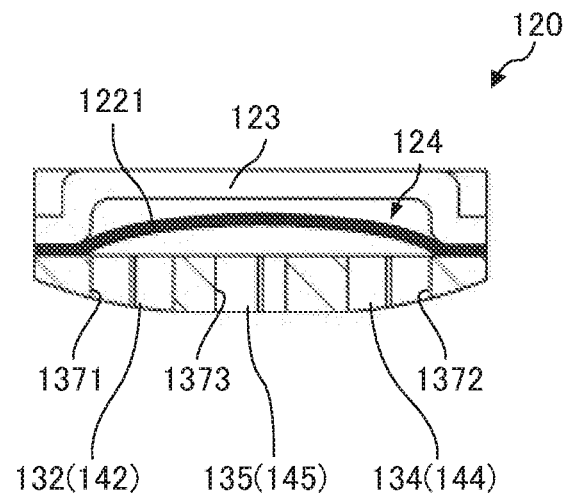

Next, long-span elastic deformation of first film 1221 is described. FIGS. 7A and 7B are sectional views of emitter 120 for describing long-span elastic deformation of first film 1221. FIGS. 7A and 7B are sectional views taken along line A-A of FIG. 3B. FIG. 7A is a sectional view of emitter 120 before long-span elastic deformation, and FIG. 7B is a sectional view of emitter 120 after long-span elastic deformation.

In the present embodiment, first film 1221 is designed such that first film 1221 is not deformed by the pressure of the irrigation liquid in the channel when the temperature of first film 1221 is low. Therefore, first film 1221 is not deformed before irrigation liquid having a high temperature is fed into tube 110 (see FIG. 7A). In addition, the degree of the deformation of resin first film 1221 increases as the temperature of first film 1221 increases; however, even when irrigation liquid having a high temperature is fed into tube 110, first film 1221 is not deformed when the pressure of the irrigation liquid is smaller than the predetermined value.

On the other hand, when the temperature of first film 1221 is greater than a predetermined value and the pressure of the irrigation liquid distributed in the channel is greater than a predetermined value in the case where irrigation liquid having a high temperature is fed into tube 110, first film 1221 is distorted toward closed space 124 formed between first film 1221 and cover 123. When resin first film 1221 is deformed by being used under a high temperature, the deformed shape is held over a long period of time. With this configuration, first film 1221 that is once distorted by the long-span elastic deformation cannot be reset to the pre-deformed original shape for a certain time period (see FIG. 7B). As a result of such deformation, first through hole 1371, second through hole 1372 and third through hole 1373 are communicated with each other through the gap formed between emitter main body 121 and first film 1221. Thus, the irrigation liquid can bypass the first channel and the second channel through the gap, and the flow rate of the irrigation liquid that flows into the irrigation liquid increases. That is, with long-span elastic deformation of first film 1221, the reduced amount of the flow rate of the irrigation liquid due to the long-span elastic deformation of second film 1222 can be offset.

Operation of Drip Irrigation Tube after Long-Span Elastic Deformation of Film

The operation of drip irrigation tube 100 until the irrigation liquid in tube 110 that is taken into emitter 120 from intake part 150 reaches first connecting channel 141 is identical to that of drip irrigation tube 100 before the long-span elastic deformation of film 122, and therefore the description thereof is omitted. In drip irrigation tube 100 after the long-span elastic deformation of film 122, a part of the irrigation liquid having reached first connecting channel 141 passes through first pressure reducing channel 142 and second connecting channel 143 and flows into second pressure reducing channel 144 and third pressure reducing channel 145 as in the operation of drip irrigation tube 100 before the long-span elastic deformation of film 122.

Next, the irrigation liquid having entered third pressure reducing channel 145 flows into channel opening-closing part 170 through third connecting through hole 174. The irrigation liquid having entered channel opening-closing part 170 flows into flow rate reducing part 160 through channel opening-closing through hole 173 and second connecting through hole 166. Next, the irrigation liquid having entered flow rate reducing part 160 flows into discharging part 180 through flow rate reducing through hole 164. At this time, the distance between first diaphragm part 167 and first valve seat part 162 is small due to the long-span elastic deformation of first film 1221, and the distance between second diaphragm part 175 and second valve seat part 172 is small due to the long-span elastic deformation of second film 1222. As a result, the flow rate of the irrigation liquid that flows into flow rate reducing part 160 from channel opening-closing part 170 and the flow rate of the irrigation liquid that flows into discharging part 180 from flow rate reducing part 160 are reduced. Accordingly, the flow rate of the irrigation liquid that flows into discharging part 180 and is discharged out of tube 110 from discharging port 112 of tube 110 is also reduced.

In addition, the irrigation liquid having entered second pressure reducing channel 144 flows into flow rate reducing part 160 through first connecting through hole 165. The irrigation liquid having entered flow rate reducing part 160 flows into discharging part 180 through flow rate reducing through hole 164. At this time, the distance between first diaphragm part 167 and first valve seat part 162 is small due to the long-span elastic deformation of first film 1221, and therefore the flow rate of the irrigation liquid that flows into discharging part 180 from flow rate reducing part 160 is reduced. Accordingly, the flow rate of the irrigation liquid that flows into discharging part 180 and is discharged out of tube 110 from discharging port 112 of tube 110 is also reduced.

On the other hand, in drip irrigation tube 100 after the long-span elastic deformation of film 122, another part of the irrigation liquid having reached first connecting channel 141 flows into second pressure reducing channel 144 through first through hole 1371 of first pressure reducing channel 142, a gap formed by the long-span elastic deformation of first film 1221 between emitter main body 121 and first film 1221, and second through hole 1372 of second pressure reducing channel 144. At this time, the pressure drop of the irrigation liquid that flows through the gap is smaller than that of the irrigation liquid that flows through first pressure reducing channel 142, second connecting channel 143 and second pressure reducing channel 144. Further, in the present embodiment, in the case where the irrigation liquid flows through the above-mentioned gap, the movement length of the irrigation liquid from first through hole 1371 to second through hole 1372 is shorter than the movement length from first through hole 1371 to second through hole 1372 of the irrigation liquid that flows through first pressure reducing channel 142, second connecting channel 143 and second pressure reducing channel 144. Thus, by bypassing the first channel while reducing the pressure drop of the irrigation liquid due to first pressure reducing channel 142 and second pressure reducing channel 144, the flow rate of the irrigation liquid that reaches flow rate reducing part 160 increases.

In addition, the remaining part of the irrigation liquid having reached first connecting channel 141 flows into third pressure reducing channel 145 through first through hole 1371 of first pressure reducing channel 142, the gap formed by the long-span elastic deformation of first film 1221 between emitter main body 121 and first film 1221, and third through hole 1373 of third pressure reducing channel 145. At this time, the pressure drop of the irrigation liquid that flows through the gap is smaller than that of the irrigation liquid that flows through first pressure reducing channel 142, second connecting channel 143 and third pressure reducing channel 145. Further, in the present embodiment, the movement length of the irrigation liquid from first through hole 1371 to third through hole 1373 via the gap is shorter than the movement length from first through hole 1371 to third through hole 1373 of the irrigation liquid via first pressure reducing channel 142, second connecting channel 143 and third pressure reducing channel 145. Thus, by bypassing the second channel while reducing the pressure drop of the irrigation liquid due to first pressure reducing channel 142 and third pressure reducing channel 145, the flow rate of the irrigation liquid that flows into channel opening-closing part 170 increases.

As described above, in drip irrigation tube 100 according to the present embodiment, with the deformation resulting from the long-span elastic deformation of second film 1222, the flow rate of the irrigation liquid that flows into flow rate reducing part 160 from channel opening-closing part 170 and the flow rate of the irrigation liquid that flows into discharging part 180 from flow rate reducing part 160 are reduced. However, since the gap that is formed between emitter main body 121 and first film 1221 by the deformation resulting from long-span elastic deformation of first film 1221, the flow rate of the irrigation liquid that flows into channel opening-closing part 170 and flow rate reducing part 160 increases. In this manner, the amount of the irrigation liquid reduced by the long-span elastic deformation of second film 1222 can be offset with the amount of the irrigation liquid increased by the long-span elastic deformation of first film 1221, and thus drip irrigation tube 100 according to the present embodiment can quantitatively discharge the irrigation liquid even when film 122 of emitter 120 is distorted by the long-span elastic deformation.

Effect

In emitter 120 according to the present embodiment, cover 123 is disposed on emitter main body 122 with resin film 122 therebetween, and closed space 124 is formed between a portion of film 122 and cover 123. First film 1221 is disposed to close the openings of first through hole 1371, second through hole 1372 and third through hole 1373 on first surface 1211 side, which are included in the channel. When the temperature of first film 1221 is greater than a predetermined value and the pressure of the irrigation liquid distributed in the channel is greater than a predetermined value, first film 1221 is distorted toward closed space 124 side, and thus first through hole 1371, second through hole 1372 and third through hole 1373 can be communicated with each other through the gap formed between emitter main body 121 and first film 1221. With this configuration, the flow rate of the irrigation liquid that flows into channel opening-closing part 170 and flow rate reducing part 160 can be increased. Thus, the reduced amount of the flow rate of the irrigation liquid due to the long-span elastic deformation of second film 1222 can be offset. As a result, drip irrigation tube 100 according to the present embodiment can quantitatively discharge the irrigation liquid even when film 122 is distorted by the long-span elastic deformation.

In addition, it is conceivable to increase the thicknesses of first diaphragm part 176 and second diaphragm part 175 for the purpose of suppressing reduction of the flow rate of the irrigation liquid due to the long-span elastic deformation of second film 1222.

When the thicknesses of the diaphragm parts are increased, however, the thickness of emitter 120 is increased, thus leading to pressure drop of the irrigation liquid in tube 110. In addition, the diaphragm parts are less deformed, and the cross-sectional area of the channel is reduced, thus leading to clogging. In contrast, emitter 120 according to the present embodiment does not cause such problems since emitter 120 according to the present embodiment can suppress reduction of the flow rate of the irrigation liquid due to the long-span elastic deformation of film 122 without increasing the thickness of film 122.

Note that, in emitter 120 in the present embodiment, first through hole 1371, second through hole 1372 and third through hole 1373 are included in first pressure reducing channel 142, second pressure reducing channel 144 and third pressure reducing channel 145, respectively; however, the emitter according to the present invention is not limited to this configuration. For example, as long as first through hole 1371 and second through hole 1372 are disposed in first channel, first through hole 1371 may be disposed in a channel (e.g. first connecting channel 141) other than first pressure reducing channel 142.

In addition, the configuration in which irrigation liquid can bypass in the channel is preferable from the viewpoint of effectively offsetting the above-mentioned reduction of the flow rate of the irrigation liquid; however, the emitter according to the present invention is not limited to this configuration. For example, the movement length of the irrigation liquid from first through hole 1371 to second through hole 1372 through the gap that is formed when first film 1221 is distorted by the long-span elastic deformation toward closed space 124 side may be equal to the movement length of the irrigation liquid from first through hole 1371 to second through hole 1372 via first pressure reducing channel 142, second connecting channel 143 and second pressure reducing channel 144. Also in this case, in comparison with the case where the irrigation liquid flows via first pressure reducing channel 142 and second pressure reducing channel 144, the pressure drop of the irrigation liquid is suppressed, and thus the flow rate of the irrigation liquid flowing into flow rate reducing part 160 can be increased.

Note that the configurations of the emitter and the drip irrigation tube according to the present invention are not limited to those of emitter 120 and drip irrigation tube 100 according to the embodiment. For example, the emitter may not be provided with third pressure reducing channel 145 and/or channel opening-closing part 170.

In addition, while first connecting channel 141, first pressure reducing channel 142, second connecting channel 143, second pressure reducing channel 144 and third pressure reducing channel 145 are configured to be formed when emitter 120 and tube 110 are joined in the present embodiment, first connecting channel 141, first pressure reducing channel 142, second connecting channel 143, second pressure reducing channel 144 and third pressure reducing channel 145 may be formed in advance as channels in emitter 120.

In addition, while the contact timing of deformed second film 1222 is adjusted by the difference in heights of first valve seat part 162 and second valve seat part 172 in the present embodiment, the heights of first valve seat part 162 and second valve seat part 172 may be equal to each other. In this case, the contact timing of deformed film 122 may be adjusted by setting different thicknesses and/or by using different materials (materials having different elasticities) between first diaphragm part 167 and second diaphragm part 175.

This application is entitled to and claims the benefit of Japanese Patent Application No. 2016-151364 filed on Aug. 1, 2016, the disclosure each of which including the specification, drawings and abstract is incorporated herein by reference in its entirety.

INDUSTRIAL APPLICABILITY

According to the present invention, it is possible to easily provide an emitter that can drop liquid with an appropriate rate even when used under high temperature. Accordingly, popularization of the emitter in the technical fields of drip irrigations and endurance tests where long-term dropping is required, and development in the technical fields can be expected.

REFERENCE SIGNS LIST

1 Emitter
10 Emitter main body
11 Flow rate adjustment valve
12 Flow rate control valve
13 Film
100 Drip irrigation tube
110 Tube
112 Discharging port
120 Emitter
121 Emitter main body
1211 First surface
1212 Second surface
122 Film
1221 First film
1222 Second film
123 Cover
124 Closed space
131 First connecting groove
132 First pressure reducing groove
133 Second connecting groove
134 Second pressure reducing groove
135 Third pressure reducing groove
1361 First protrusion
1362 Second protrusion
1363 Third protrusion
1371 First through hole
1372 Second through hole
1373 Third through hole
141 First connecting channel
142 First pressure reducing channel
143 Second connecting channel
144 Second pressure reducing channel
145 Third pressure reducing channel
150 Intake part
151 Intake side screen part
152 Intake through hole
153 Intake recess
154 Slit
155 Protrusion line
160 Flow rate reducing part
161 Flow rate reducing recess
162 First valve seat part
163 Communication groove
164 Flow rate reducing through hole
165 First connecting through hole
166 Second connecting through hole
167 First diaphragm part
170 Channel opening-closing part
171 Channel opening-closing recess
172 Second valve seat part
173 Channel opening-closing through hole
174 Third connecting through hole
175 Second diaphragm part
180 Discharging part
181 Discharging recess
182 Entry preventing part

What is claimed is:

1. An emitter configured to be joined on an inner wall surface of a tube for distributing irrigation liquid at a position corresponding to a discharging port for communicating between inside and outside of the tube, the emitter being configured to quantitatively discharge the irrigation liquid in the tube to the outside of the tube from the discharging port, the emitter comprising:
  an emitter main body including a first surface and a second surface disposed opposite to each other;
  a first film having flexibility and joined on the first surface of the emitter main body, the first film being made of resin;
  a second film having flexibility and joined on the first surface of the emitter main bode, the second film being made of resin;
  a cover disposed on the emitter main body with the first film sandwiched between the cover and the emitter main body;
  an intake part disposed in the first surface of the emitter main body, and configured to receive the irrigation liquid;
  a discharging part disposed in the second surface of the emitter main body, and configured to discharge the irrigation liquid;

a channel configured to connect the intake part and the discharging part in the emitter main body, and configured to distribute the irrigation liquid;

a first pressure reducing channel disposed in the channel, and configured to reduce a pressure of the irrigation liquid received by the intake part;

a second pressure reducing channel disposed downstream of the first pressure reducing channel in the channel, and configured to reduce a pressure of the irrigation liquid received by the intake part; and a flow rate reducing part disposed downstream of the second pressure reducing channel in the channel, and configured to reduce a flow rate of the irrigation liquid in accordance with deformation of the second film deformed by a pressure of the irrigation liquid in the tube, wherein a closed space is formed between a portion of the first film and the cover, wherein the channel includes a first through hole and a second through hole, the first through hole being disposed in the first pressure reducing channel, the first through hole opening at the first surface and the second surface of the emitter main body, the second through hole being disposed in the second pressure reducing channel, the second through hole opening at the first surface and the second surface of the emitter main body, wherein the first film is disposed to close openings of the first through hole and the second through hole on the first surface side, and wherein the first film is distorted in a direction of the closed space by deformation that is caused when a temperature of the first film is greater than a predetermined temperature value and a pressure of the irrigation liquid distributed in the channel is greater than a predetermined first pressure value such that the first through hole and the second through hole communicate with each other through a gap formed between the emitter main body and the first film.

2. The emitter according to claim 1, wherein a movement length of the irrigation liquid from the first through hole to the second through hole via the gap formed when the first film is distorted in the direction of the closed space by deformation that is caused when the temperature of the first film is greater than the predetermined temperature value and the pressure of the irrigation liquid distributed in the channel is greater than the predetermined first pressure value is shorter than a movement length of the irrigation liquid from the first through hole to the second through hole via the channel.

3. The emitter according to claim 1, wherein the flow rate reducing part includes:

a recess disposed in the first surface of the emitter main body;

a diaphragm part having flexibility that is a portion of the second film and is disposed to close an opening of the recess, the diaphragm part being configured to be distorted in a direction of the recess when the pressure of the irrigation liquid in the tube is greater than a predetermined second pressure value;

a third through hole opening at an inner surface of the recess, and communicated with one of the discharging part and the second pressure reducing channel;

a fourth through hole opening at the inner surface of the recess, and communicated with the other of the discharging part and the second pressure reducing channel;

a valve seat part disposed to surround the third through hole or the fourth through hole and to face the diaphragm part without making contact with the diaphragm part, wherein the valve seat part is allowed to make intimate contact with the diaphragm part when the pressure of the irrigation liquid in the tube is greater than the predetermined second pressure value; and a communication groove formed in a surface capable of making intimate contact with the diaphragm part of the valve seat part, the communication groove being configured to communicate between inside of the recess and the third through hole or the fourth through hole surrounded by the valve seat part.

4. The emitter according to claim 3, wherein the emitter main body, the first film and the second film are formed with one material having flexibility; and wherein the diaphragm part is integrally shaped as a portion of the emitter.

5. A drip irrigation tube comprising:

a tube including a discharging port for discharging irrigation liquid; and the emitter according to claim 1 that is joined on the inner wall surface of the tube at a position corresponding to the discharging port.

* * * * *